United States Patent
Cann

(10) Patent No.: US 10,677,103 B2
(45) Date of Patent: Jun. 9, 2020

(54) SYSTEM AND METHOD OF PHASE CHANGE EXPANSION

(71) Applicant: Mark Cann, Cocoa Beach, FL (US)

(72) Inventor: Mark Cann, Cocoa Beach, FL (US)

( * ) Notice: Subject to any disclaimer, the term of this patent is extended or adjusted under 35 U.S.C. 154(b) by 171 days.

(21) Appl. No.: 16/122,830

(22) Filed: Sep. 5, 2018

(65) Prior Publication Data
US 2020/0072088 A1 Mar. 5, 2020

(51) Int. Cl.
*F01K 21/00* (2006.01)
*F01K 27/00* (2006.01)
*F02C 1/00* (2006.01)

(52) U.S. Cl.
CPC ............ *F01K 21/005* (2013.01); *F01K 27/00* (2013.01); *F02C 1/00* (2013.01)

(58) Field of Classification Search
CPC ...... F01K 21/045; F01K 21/005; F01K 21/02; F01K 21/04; F01K 27/00; F01K 17/06; F01K 25/04; F01K 25/06; F02C 1/00; F02C 1/002; F02C 1/005; F02C 1/02
See application file for complete search history.

(56) References Cited

U.S. PATENT DOCUMENTS

| 8,468,829 | B2 * | 6/2013 | De Reyes | F01K 15/02 60/226.1 |
| 2005/0199747 | A1 * | 9/2005 | Roarty | F01K 21/005 239/135 |
| 2007/0151969 | A1 * | 7/2007 | Tain | F01K 21/02 219/631 |

FOREIGN PATENT DOCUMENTS

GB 2075602 A * 11/1981 ............. F01D 25/32

* cited by examiner

*Primary Examiner* — Mark A Laurenzi
*Assistant Examiner* — Xiaoting Hu

(57) ABSTRACT

The present invention is a system and method of power medium expansion that functions with a rate of efficiency higher than systems found in prior art. Novel features of the system increase the overall efficiency with the use of a power medium that begins the cycle in the liquid state and enters the gaseous state. An additional novel feature is the use of additional heat that may also increase the overall cycle efficiency. Another additional novel feature is recuperating energy that can supplement the phase change of the power medium along with isolating the components from the ambient.

2 Claims, 2 Drawing Sheets

SYSTEM AND METHOD OF PHASE CHANGE EXPANSION

CROSS-REFERENCE TO RELATED APPLICATIONS

This application claims priority from provisional U.S. Application No. 62/555,026 filed Sep. 6, 2017, which is incorporated herein by reference in its entirety.

FIELD OF THE INVENTION

The present invention is in the technical field of power medium. More particularly, the present invention is in the technical field of expansion of power medium that includes a change of phase of the power medium from liquid state to gaseous state.

BACKGROUND OF THE INVENTION

Previous methods of expansion of power medium have a lower rate of efficiency by not utilizing the potential energy present in the power medium or ambient. The use of power medium that changes phase is well known and the information in the prior art references is incorporated by reference into this system and method.

U.S. Pat. No. 9,884,546B2 (Ayres, Clarke, Dearman) details a system for using a cryogen to generate power. The system has a lower rate of efficiency by not recuperating potential energy or isolating components from the ambient.

U.S. Pat. No. 8,468,829B2 (De Reyes) details a system that uses a turbine to convert liquid nitrogen into power. The system has a lower rate of efficiency by not recuperating potential energy or isolating components from the ambient.

SUMMARY OF THE INVENTION

The present invention is a system and method of power medium expansion that functions with a rate of efficiency higher than systems found in prior art. Novel features of the system increase the overall efficiency with the use of a power medium that begins the cycle in the liquid state and enters the gaseous state. An additional novel feature is the use of additional heat that may also increase the overall cycle efficiency. Another additional novel feature is recuperating energy that can supplement the phase change of the power medium along with isolating the components from the ambient.

DETAILED DESCRIPTION OF THE INVENTION

Referring to the figures provided by way of exemplification and not limitation, a system having preferred features of the present invention is described. As seen in the figures, components of the present invention may have features of other expansion systems, but has differences that provide novel and useful features for the expansion of a power medium.

Figure 1:
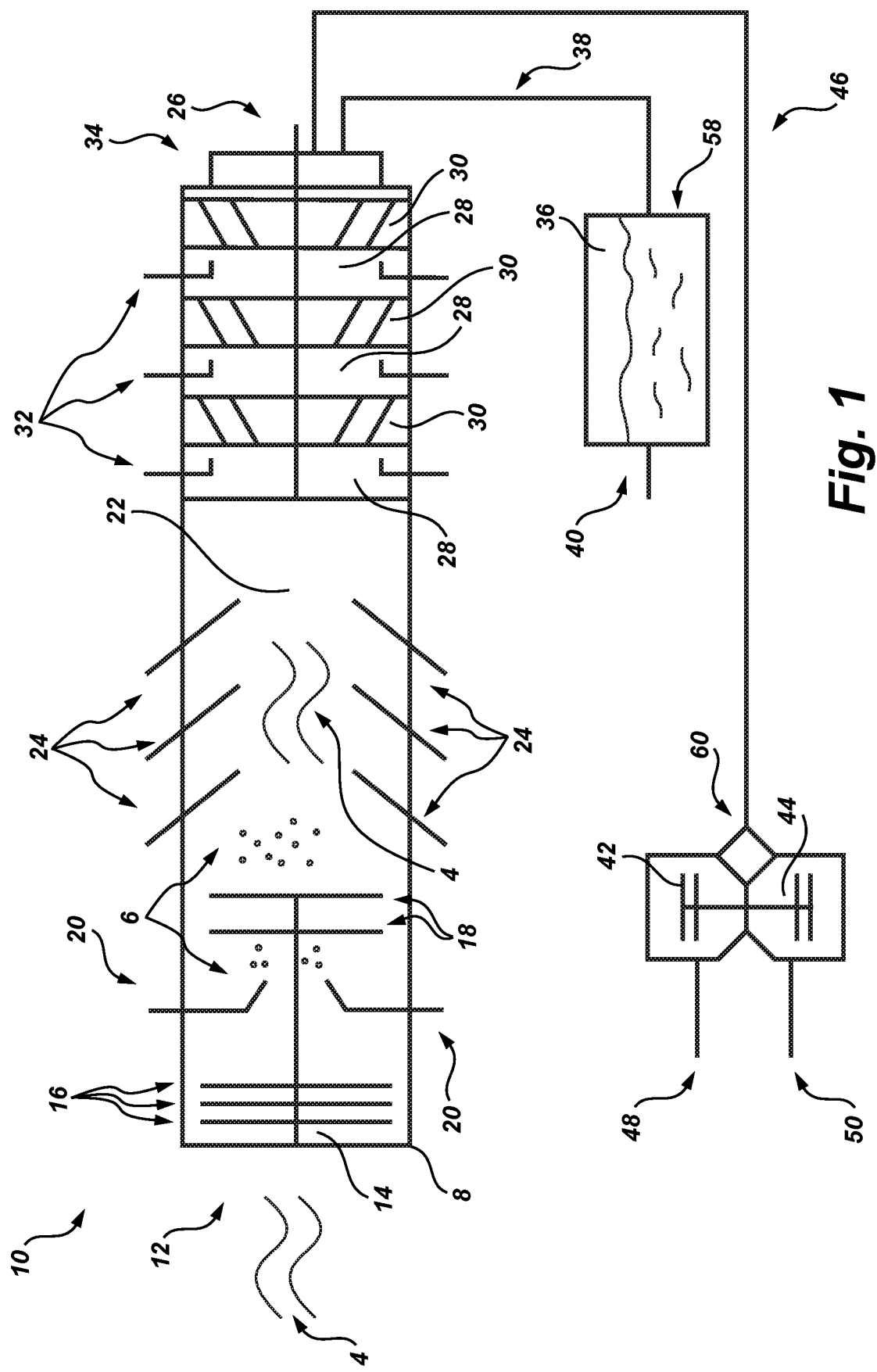
FIG. 1 is a perspective view of the main components of the present invention.

Referring now to the invention in FIG. 1 there is shown a system 10 that contains a vessel 8 with input port 12 that transmits a compressible gas 4, such as atmospheric air, and second input port 20 that transmits a liquid power medium 6, such as liquefied atmospheric air. A shaft 14 is located inside the vessel 8 with compression turbine(s) 16 and expansion turbine(s) 18 mounted on the same shaft 14. The second input port(s) 20 injects the liquid power medium 6 between the compression turbine(s) 14 and expansion turbine(s) 18. As the compressible gas 4 flows from the input port 12 through the compression turbine(s) 14, both the temperature and pressure of the compressible gas 4 increase. As the liquid power medium 6 exits the second input port(s) 20, the state of the liquid changes to the gaseous state due to the relative temperature and pressure of the compressible gas 4 that flows from the compressible turbine(s) 16. As the liquid power medium 6 changes phase the pressure of the resulting compressible gas 4 increases before flowing through the expansion turbine(s) 18. The compression turbine(s) 14 are driven by the expansion turbine(s) 18 via the shaft 14. Additional compressible gas 4 enters the vessel 8 after the expansion turbine(s) 18 in the mixing area 22 via input port(s) 24. Heat from the compressible gas 4 provides the thermal energy required for the phase of the liquid power medium 6 to change state and mix with the compressible gas 4. The compressible gas 4 now flows through the stator(s) 28 which increases the velocity of the gas. Rotor(s) 30 located between the stator(s) 28 are mounted on an output shaft 26. Power is available on the output shaft 26 as the compressible gas 4 flows through the rotor(s) 30. A heat transfer fluid 36 contacts with the compressible gas 4 via input ports 32 located within the stator(s) 28. The heat transfer fluid 36 provides thermal energy to the compressible gas 4 when flowing through the rotor(s) 30. The power from the output shaft 26 can drive a generator, pump, or any other mechanical device directly or through a gearbox. A gas/liquid separator 34 is located after the last rotor 30 in order to reclaim the heat transfer fluid 36 from the compressible gas 4. A transfer fluid return pipe 38 connects to the heat exchanger 58 that collects thermal energy from external source or ambient. The heat exchanger exit 40 allows the heat transfer fluid 36 to flow into the input ports 32 located within the rotor(s) 28. The compressible gas 4 exist the gas/liquid separator 34 and flows through the compressible gas return pipe 46, reaching a diversion valve 60. The compressible gas 4 that flows through the recovery turbine 42 transmits any remaining pressure to the recovery compressor 44 before flowing through the recovery turbine exit 48. The compressible gas 4 that flows through the diversion valve 60 and into the recovery compressor 44 has the pressure and temperature increased and flows through the recovery compressor exit 50 and enters the input port 12 or port(s) 24 located in the vessel 8.

In further detail, still referring to the invention of FIG. 1, the dimensions of the vessel 8 can vary depending on the system 10 requirement and surrounding environment. The ratio of the flow rates of the compressible gas 4 and liquid power medium 6 inside the vessel 8 may change depending on the system 10 requirement and surrounding environment. The size and shape of the mixing area 22 may vary depending on the system 10 requirements and surrounding environment. The size and shape of the recovery turbine 42 and recovery compressor 44 may vary depending on the system 10 requirements and surrounding environment.

The construction details of the invention as shown in FIG. 1 are that the vessel 8 compression turbine(s) 16 expansion turbine(s) 18 stator(s) 28 rotor(s) 30 mixing area 22 compressible gas return pipe 46 and heat fluid return pipe 38 gas/liquid separator 34 and heat exchanger 58 may be made of any material sufficiently rigid and strong enough to handle the forces of the liquefied power medium 6, compressible gas 4 as well as the rotation forces. The size and shape of the vessel 8 compression turbine(s) 16 expansion turbine(s) 18 stator(s) 28 rotor(s) 30 mixing area 22 compressible gas return pipe 46 and liquid return pipe 38 can vary to meet specific requirements.

The system 10 shown in FIG. 1 shows a single stage and multiple stages can be combined to form a system 10. The compressible gas return pipe 46 can be combined with other stages in either a parallel or series arrangement. The heat fluid return pipe 38 can be combined with other stages in either a parallel or series arrangement. The output shaft 26 can be combined with other stages in either a parallel or series arrangement.

Figure 2:
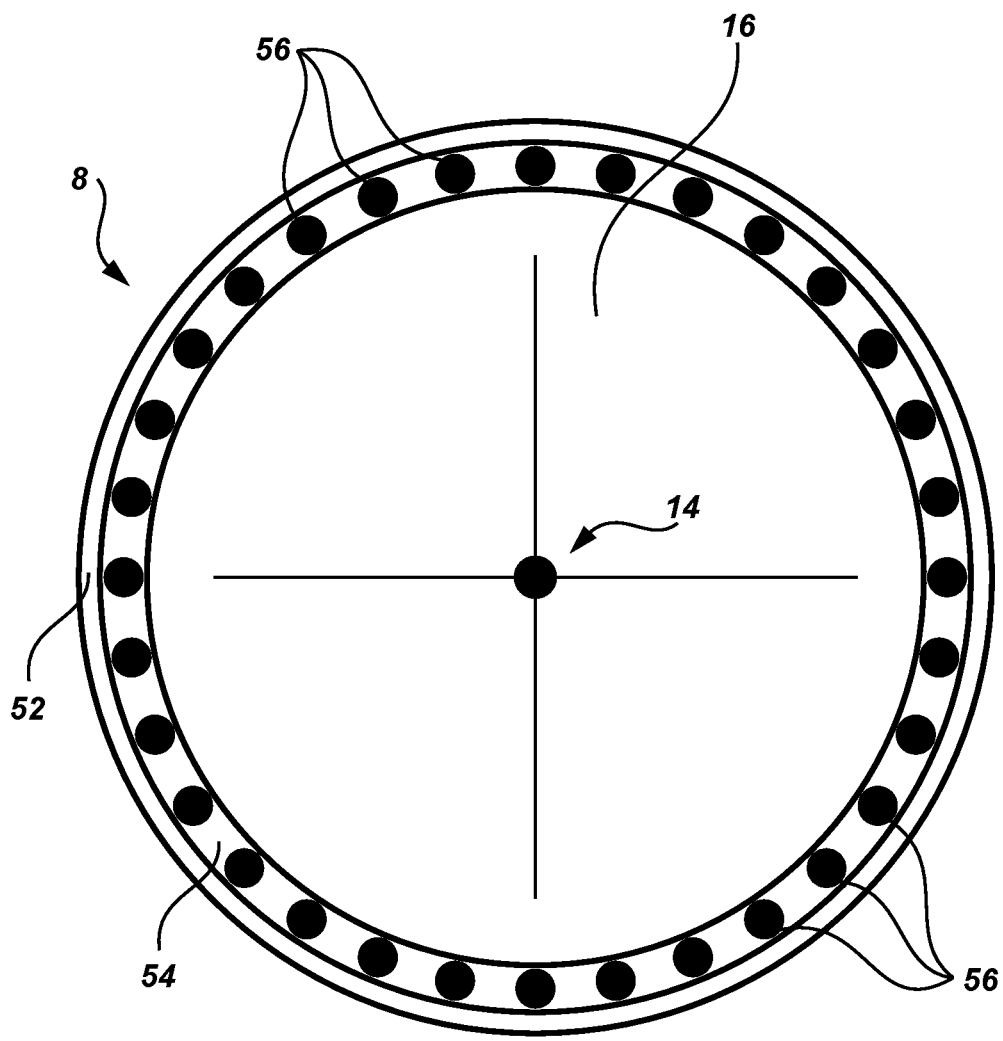
FIG. 2 is an alternative view of some of the components of the present invention.

Referring now to the invention in FIG. 2 there is shown an alternative view of the vessel 8 that contains the shaft 14 with compression turbine(s) 16 mounted. There is an insulating layer 52 to isolate the vessel 8 from the ambient. Inside of the insulating layer 52 there is an additional layer that forms the heat transfer layer 54. Contained within the heat transfer layer 54 are heat pipe(s) 56. The heat pipe(s) 56 transfer thermal energy from one end of the vessel 8 to the other.

In further detail, still referring to the invention of FIG. 2, with the presence of the heat pipe(s) 56 within the heat transfer layer 54 along with the insulating layer 52, the level of thermal energy throughout the vessel 8 can be relatively equal.

The construction details of the invention as shown in FIG. 2 are that the vessel 8 insulating layer 52 heat transfer layer 54 and heat pipe(s) 56 may be made of any material sufficiently rigid and strong enough to handle the forces of the liquefied power medium 6, compressible gas 4 as well as the rotation forces. The size and shape of the vessel 8 insulating layer 52 heat transfer layer 54 and heat pipe(s) 56 may vary to meet specific requirements.

In broad embodiment, the present invention is a system and method of power medium expansion that functions with a rate of efficiency higher than systems found in prior art. Novel features of the system increase the overall efficiency with the use of a liquid power medium 6 that changes state to a gas while mixing with a compressible gas 4 that has exited compression turbine(s) 16. An additional novel feature is the use capturing additional heat when available or ambient heat to increase the overall cycle efficiency.

Modifications of the structure, arrangement, proportions, elements, materials, and components used in the practice of the present invention, and otherwise, some of which are adapted to specific environments and operative requirements, can be made without departing from the principles of the present invention. Various types of electrical controls may be required, which have not been shown or discussed. Various types of valves may be required, which have not been shown or discussed.

While the foregoing written description of the invention enables one of ordinary skill to make and use what is considered the best mode thereof, those of ordinary skill will understand and appreciate the existence of variations, combinations, and equivalents of the specific embodiment, method, and examples. The invention should therefore not be limited by the above described embodiment, method, and examples, but by all embodiments and methods within the scope and spirit of the invention as claimed.

The present invention may be carried out in other specific ways than those set forth without departing from the essential characteristics of the invention. The present embodiment are, therefore, to be illustrative and not restrictive, and all changes coming within the meaning and equivalency range of the appended claims are embraced.

It should be understood that other liquids will be the mechanical equivalent of liquefied atmospheric air in the system described and claimed. It should be understood that other gases will be the mechanical equivalent of atmospheric air in the system described and claimed.

What I claim as my invention is:

1. A phase change expansion system comprising:
    a. a compressible gas source;
    b. a liquid power medium source;
    c. a vessel (8) with a first input port (12) connected to the compressible gas source and a second input port (20) connected to the liquid power medium source, compressible gas from the compressible gas source and liquid power medium from the liquid power medium source being mixed together in the vessel (8);
    d. a compression device (16) located in the vessel after the first input port (12);
    e. an expansion turbine (18) located in the vessel after the second input port (20);
    f. a first shaft (14) that connects the expansion turbine (18) to the compression device (16);
    g. a mixing area (22) located in the vessel after the compression device (16) and the expansion turbine (18), the mixing area (22) containing inlet port(s) (24) connected to the compressible gas source;
    h. a second shaft (26) with stator(s) (28) and rotor(s) (30) located in the vessel after the mixing area (22);
    i. heat transfer fluid input ports (32) located within the stator(s) (28) and connected to receive a heat transfer fluid (36);
    j. a liquid gas separator (34) located after the rotor(s) (30) to separate the heat transfer fluid (36) from the compressible gas;
    k. a heat transfer fluid return pipe (38) connected to the liquid gas separator (34);
    l. a compressible gas return pipe (46) connected to the liquid gas separator (34);
    m. a heat exchanger (58) connected to receive the heat transfer fluid from the heat transfer fluid return pipe (38) and to heat the heat transfer fluid;
    n. a recovery turbine (42) that connects with a recovery compressor (44), the recovery turbine (42) and the recovery compressor (44) each connected to receive a portion of the compressible gas from the compressible gas return pipe (46);
    o. heat pipe(s) (56) located within the vessel (8) to transfer thermal energy from one end of the vessel (8) to the other end of the vessel (8); and
    p. an insulating layer (52) located around the vessel (8) to isolate the vessel (8) from the ambient.

2. A method of phase change expansion, comprising the following steps:
    a. selecting a system that includes:
        a compressible gas source;
        a liquid power medium source;
        a vessel (8) with a first input port (12) connected to the compressible gas source and a second input port (20) connected to the liquid power medium source, compressible gas from the compressible gas source and liquid power medium from the liquid power medium source being mixed together in the vessel (8);

a compression device (16) located in the vessel after the first input port (12);

an expansion turbine (18) located in the vessel after the second input port (20);

a first shaft (14) that connects the expansion turbine (18) to the compression device (16);

a mixing area (22) located in the vessel after the compression device (16) and the expansion turbine (18), the mixing area (22) containing inlet port(s) (24) connected to the compressible gas source;

a second shaft (26) with stator(s) (28) and rotor(s) (30) located in the vessel after the mixing area (22);

heat transfer fluid input ports (32) located within the stator(s) (28) and connected to receive a heat transfer fluid (36);

a liquid gas separator (34) located after the rotor(s) (30) to separate the heat transfer fluid (36) from the compressible gas;

a heat transfer fluid return pipe (38) connected to the liquid gas separator (34);

a compressible gas return pipe (46) connected to the liquid gas separator (34);

a heat exchanger (58) connected to receive the heat transfer fluid from the heat transfer fluid return pipe (38) and to heat the heat transfer fluid;

a recovery turbine (42) that connects with a recovery compressor (44), the recovery turbine (42) and the recovery compressor (44) each connected to receive a portion of the compressible gas from the compressible gas return pipe (46);

heat pipe(s) (56) located within the vessel (8) to transfer thermal energy from one end of the vessel (8) to the other end of the vessel (8); and an insulating layer (52) located around the vessel (8) to isolate the vessel (8) from the ambient;

b. flowing the compressible gas into the vessel (8) via the first input port (12) and compressing the compressible gas in the compression device (16) to increase the temperature and pressure of the compressible gas;

c. flowing the liquid power medium into the vessel (8) via the second input port (20), the liquid power medium changing phase to the gaseous state due to the temperature and pressure of the compressible gas and mixing with the compressible gas to increase the pressure of the compressible gas;

d. flowing the compressible gas through the expansion turbine (18), the expansion turbine (18) driving the compression device (16);

e. flowing additional compressible gas into the mixing area (22) via the inlet port(s) (24) which results in a stream that consists of the compressible gas from the first input port (12), the liquid power medium from the second input port (20) that changed to the gaseous state, and the additional compressible gas from the inlet port(s) (24);

f. flowing the stream through the stator(s) (28) into the rotor(s) (30) and converting the potential energy of the stream via the second shaft (26);

g. flowing the heat transfer fluid (36) into the stator(s) (28) via the heat transfer fluid input ports (32) to adjust the temperature of the stream;

h. capturing the potential energy remaining in the stream via the recovery turbine (42) and transmitting the captured potential energy, via the recovery compressor (44), into the compressible gas that flows into the first input port (12) and the inlet port(s) (24);

i. transferring thermal energy from one end of the vessel (8) to the other end of the vessel (8) via the heat pipe(s) (56) located within the vessel (8); and j. slowing the transfer of thermal energy from the vessel to the ambient via the insulating layer (52) located around the vessel (8).

\* \* \* \* \*